F. WOODBRIDGE.
Car-Hose Coupling.

No. 216,010. Patented May 27, 1879.

WITNESSES

INVENTOR
Frank Woodbridge
Gilmore, Smith & Co.
ATTORNEYS

UNITED STATES PATENT OFFICE.

FRANK WOODBRIDGE, OF SPRINGFIELD, OHIO.

IMPROVEMENT IN CAR-HOSE COUPLINGS.

Specification forming part of Letters Patent No. 216,010, dated May 27, 1879; application filed April 12, 1879.

*To all whom it may concern:*

Be it known that I, FRANK WOODBRIDGE, of Springfield, in the county of Clarke and State of Ohio, have invented certain new and useful Improvements in Car-Hose Couplings; and I do hereby declare that the following is a full, clear, and exact description of the construction and operation of the same, reference being had to the annexed drawings, making a part of this specification, and to the letters and figures of reference marked thereon.

Figure 1:
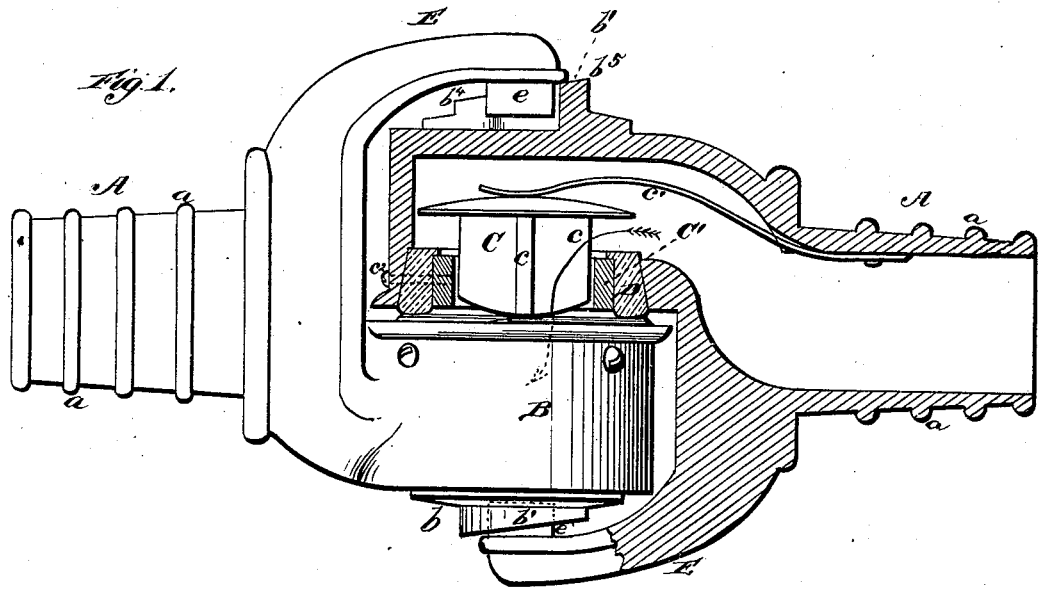
Figure 2:
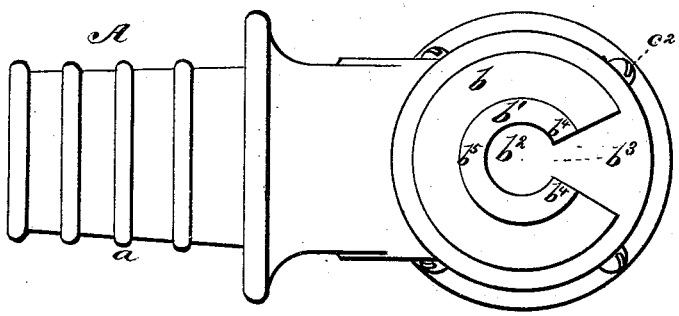
Figure 3:
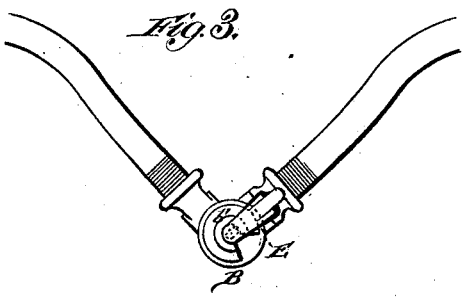

Figure 1 is a plan view, partly in section, of a car-hose coupling embodying the improvements in my invention. Fig. 2 is a bottom view of one section of the coupling. Fig. 3 is an elevation, showing the coupling connected.

This invention relates to car-hose couplings adapted to be used in connection with air-brakes or car-heaters; and it consists of two parts, constructed and operating alike, each being provided with a valve, operated by a spring inside of the coupling, and an automatic locking and unlocking device, combined and operating together, as will be hereinafter fully described, and particularly pointed out in the claims.

A represents the stem of the hose-coupling, provided with the common projections $a$, to better secure the hose to the same. The bowl B of the coupling is provided on its bottom $b$ with a cam, $b^1$, located in an annular position about the center of the bottom in such a manner as to form a cup, $b^2$, having an ingress, $b^3$, to the cup $b^2$. This cam is of equal height at the points $b^4$ $b^4$, and gradually raises toward the point $b^5$, so that it will operate in either direction, as hereinafter explained.

The valve C is provided with the common webs $c$, which are fitted to the interior face of the ring C', so as to freely play in its bearings. This valve is held in its closed position by means of the spring $c^1$, which extends up the stem and is riveted thereto.

The ring C' is held in position by the threaded bolts $c^2$, and the rubber ring D is inserted between C' and the bowl, and serves the double purpose of a seat for the valve when in a closed position, and an elastic packing when the coupling is in contact with its companion piece, as shown in Fig. 1. The office of the spring $c^1$ is to close the valves instantly upon the uncoupling of the parts.

E is an arm extending from the butt or shoulder of the coupling, provided with a lug, $e$, located upon its inner surface, opposite the center of the valve C. These couplings are constructed exactly alike, there being no male and female parts. By this means any two will act together.

The operation of the invention is as follows: Place the two couplings together, as shown in Fig. 1, and press them toward each other. The result is that the valves C depress each other, thus forming the air-communication between them at the time that the lugs $e$ enter the cups $b^2$ by the ingress $b^3$. The connection of the couplings is now formed, and it is secured and located by depressing the coupling, as shown in Fig. 3, by allowing it to sag the hose into the position shown. The locking is accomplished by the arms E traveling up the inclines from either front $b^4$ to the point $b^5$ of the cam $b^1$. This motion brings the cups nearer in contact and depresses the rubber packing D.

The uncoupling of these parts may be effected automatically simply by applying tension to the hose sufficient to straighten the coupling when the lugs pass out of the cups $b^2$ and the springs close the valves. In case the cars should become uncoupled without attention being paid to the coupling of the hose, the same, if provided with my couplings, will uncouple without injury.

What I claim as new, and desire to secure by Letters Patent, is—

1. In a hose-coupling, the bowl B, provided with the annular ring C' and rubber packing D, in combination with the valve C and spring $c^1$, as and for the purposes substantially as set forth.

2. In a hose-coupling, the cam $b^1$, provided with the double inclines $b^4$ $b^5$, the cup $b^2$, and ingress $b^3$, as and for the purposes substantially as set forth.

3. In a hose-coupling, the combination of two coupling-pieces constructed alike, each having ring C' and rubber packing D, valve C, spring $c^1$, cam $b^1$, arm E, and lug $e$, constructed and operated together as and for the purposes substantially as set forth.

In testimony that I claim the above I have hereunto subscribed my name in the presence of two witnesses.

FRANK WOODBRIDGE.

Witnesses:
  CHAS. L. WILLIAMS,
  F. FRANKENBERG.